United States Patent

[11] 3,573,437

[72] Inventors Thomas J. Scuitto
Malibu;
William B. Newby, Los Angeles, Calif.

[21] Appl. No. 734,275
[22] Filed June 4, 1968
[45] Patented Apr. 6, 1971
[73] Assignee Wyle Laboratories
El Segundo, Calif.

[54] BI-DIRECTIONAL CARD READING SYSTEM
4 Claims, 7 Drawing Figs.

[52] U.S. Cl. .......... 235/61.11, 340/174.1
[51] Int. Cl. .......... G06k 7/14, G11b 5/48
[50] Field of Search .......... 340/174 (CT), 174.1 (C), 174.1 (H); 235/61.6 (A), 61.11, 61.112, 61.113, 61.6, 61.6 (A), 61.61; 197/20

[56] References Cited

UNITED STATES PATENTS

| | | | |
|---|---|---|---|
| 2,918,656 | 12/1959 | Nolde | 340/174.1C |
| 2,943,907 | 7/1960 | Dickinson | 340/174.1C |
| 2,975,407 | 3/1961 | O'Brien | 340/174.1C |
| 3,002,681 | 10/1961 | Norton | 235/61.11 |
| 3,025,941 | 3/1962 | Blodgett | 197/20 |
| 3,196,403 | 7/1965 | Ivins | 235/61.6X |
| 3,236,428 | 2/1966 | Yamane | 226/24 |
| 3,275,804 | 9/1966 | Folsom | 235/61.6 |
| 3,297,929 | 1/1967 | Gardner | 235/61.6A |
| 3,328,788 | 6/1967 | Taris | 340/174.1H |

*Primary Examiner*—Daryl W. Cook
*Assistant Examiner*—Robert M. Kilgore
*Attorney*—Samuel Lindenberg & Arthur Freilich

ABSTRACT: A system for use in conjunction with a digital calculator for reading program cards or other indicia bearing records. The system includes a transport mechanism capable of selectively moving a card in opposite directions. Data on the card defines a sequence of calculator instructions. Reading means sequentially reads the instructions as the card is moved in a forward direction to thus cause the calculator to execute the operations identified by the instructions. Means are provided responsive to conditional and unconditional branch instructions for reading the instructions out of sequence. For example, in response to a CONDITIONAL REWIND instruction and the content of one of the calculator registers, the card is moved in a reverse direction until a FORWARD instruction is sensed.

Patented April 6, 1971

3,573,437

2 Sheets-Sheet 1

INVENTORS
THOMAS J. SCUITTO
WILLIAM B. NEWBY
BY Lindenberg & Freilich
ATTORNEYS

Patented April 6, 1971 3,573,437
2 Sheets-Sheet 2
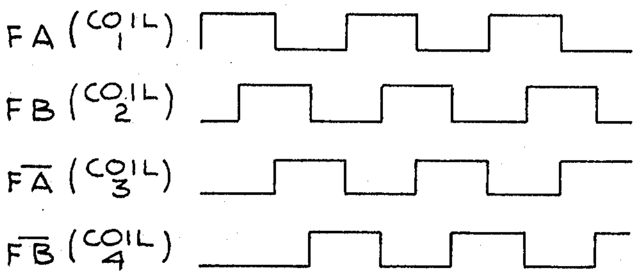
Fig. 2 (a)
FORWARD
| | SET | RESET | |
|---|---|---|---|
| (1) | FA | | $\overline{FA} \cdot \overline{FB}$ |
| (2) | FB | | $FA \cdot \overline{FB}$ |
| (3) | | FA | $FA \cdot FB$ |
| (4) | | FB | $\overline{FA} \cdot FB$ |
Fig. 2 (b)
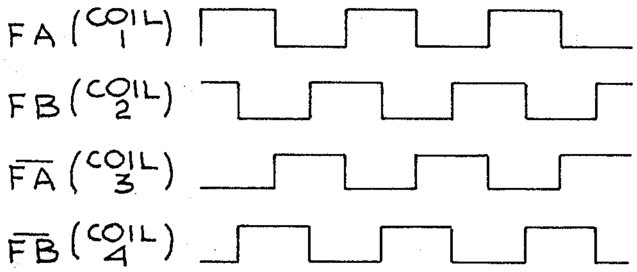
Fig. 3 (a)
REVERSE
| | SET | RESET | |
|---|---|---|---|
| (1) | FA | | $\overline{FA} \cdot FB$ |
| (2) | FB | | $\overline{FA} \cdot \overline{FB}$ |
| (3) | | FA | $FA \cdot \overline{FB}$ |
| (4) | | FB | $FA \cdot FB$ |
Fig. 3 (b)
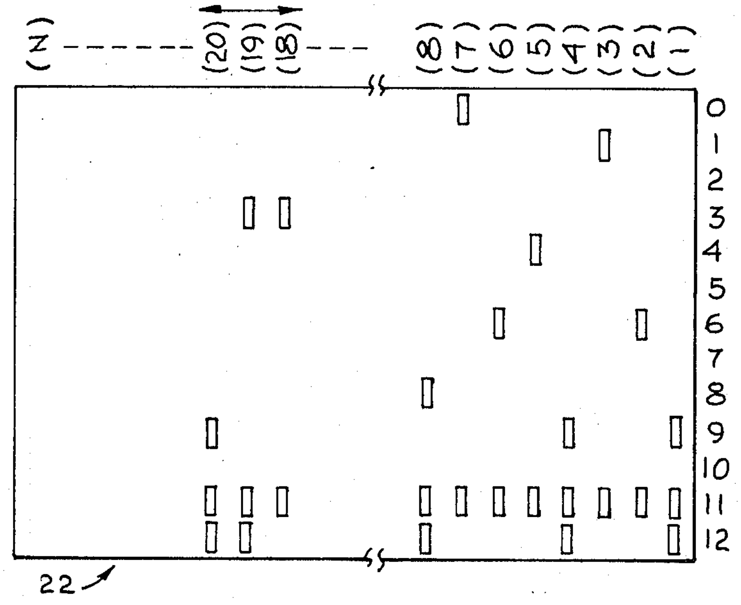
Fig. 4 (a)
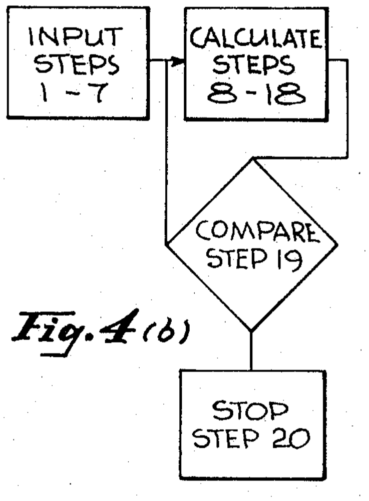
Fig. 4 (b)
INVENTORS
THOMAS J. SCUITTO
WILLIAM B. NEWBY
BY Lindenberg + Freilich
ATTORNEYS

BI-DIRECTIONAL CARD READING SYSTEM

BACKGROUND OF THE INVENTION

1. Field of the Invention

This invention relates generally to digital calculators and more particularly to apparatus for causing such calculators to automatically execute a series of instructions including conditional and unconditional branch instructions.

2. Description of the Prior Art

Electromechanical calculators have been used for many years for executing simple arithmetic operations in response to the manual actuation of numeric and operation keys. In recent years many electronic calculators have been introduced which, like their electromechanical predecessors, execute operations in response to the actuation of keys. It is primarily in this respect that electronic digital calculators differ from electronic digital computers which execute operations in response to an internally stored series of instructions, referred to as a program.

Limited attempts have been made to program electronic calculators so as to cause them to automatically execute a sequence of arithmetic operations. For example, in the calculator disclosed in U.S. Pat. No. 3,330,946, means are provided for producing a punched paper tape in response to the manual actuation of keys which paper tape can subsequently be utilized to cause the calculator to sequentially execute the operations identified on the tape. Although such an automatic sequencing capability can considerably extend the usefulness of the calculator, it fails to match the decision making or branching capabilities of programmed digital computers.

In view of the foregoing, it is an object of the present invention to provide an apparatus suitable for use with an electronic calculator for automatically executing a series of instructions including conditional and unconditional branch instructions.

SUMMARY OF THE INVENTION

Briefly, the present invention is directed to a system for reading records, e.g. cards, bearing indicia defining a sequence of instructions, including conditional and unconditional branch instructions, for controlling the execution of a calculator operations and the subsequent reading of the indicia bearing records.

More particularly, in accordance with a preferred embodiment of the invention, a bidirectional card transport mechanism is provided which is controlled in response to instructions read from the card and the contents of certain calculator registers. For example, in response to a conditional REWIND instruction, the transport mechanism will move the card in a reverse direction to a forward instruction only if the content of an A register (accumulator) is negative. If the accumulator content is positive, the card will be moved in a forward direction to read the next instruction. By enabling a program card to be read bidirectionally, a calculator can be automatically controlled to execute problems requiring successive iterations.

The novel features of the invention are set forth with particularity in the appended claims. The invention will best be understood from the following description when read in conjunction with the accompanying drawings.

BRIEF DESCRIPTION OF THE DRAWINGS

FIG. 2A is a wave form chart illustrating the wave forms generated in the system of FIG. 1 to move a program card in a first direction;

FIG. 2B is a truth table illustrating the manner of controlling the flip-flops of FIG. 1 in order to generate the wave forms of FIG. 2A;

FIG. 3A is a wave form chart illustrating the wave forms generated in the system of FIG. 1 to move a program card in a second direction;

FIG. 3B is a truth table illustrating the manner of controlling the flip-flops of FIG. 1 in order to generate the wave forms of FIG. 3A;

FIG. 4A illustrates a typical program card which can be utilized by the system of FIG. 1; and FIG. 4B is a flow chart describing the operation of a typical program which can be executed utilizing an embodiment of the present invention.

DESCRIPTION OF THE PREFERRED EMBODIMENTS

Figure 1:
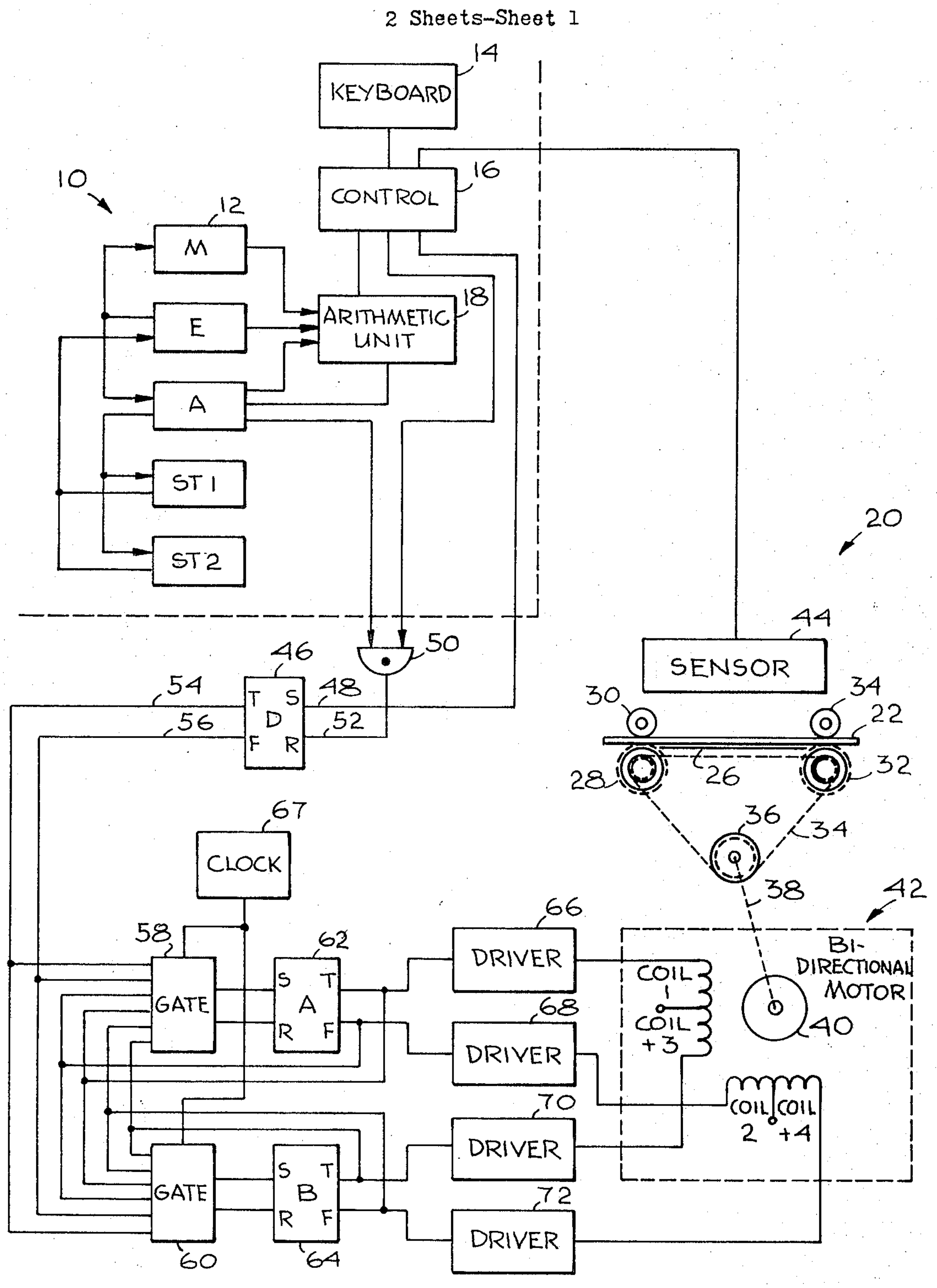
FIG. 1 is a block diagram of a system in accordance with the present invention.

Attention is now called to FIG. 1 which illustrates a preferred embodiment of the present invention. As previously pointed out, the present invention is primarily intended to be utilized in conjunction with a calculator, for example, of the type generally represented by the numeral 10 in FIG. 1. Briefly, the calculator 10 can include a plurality of number storing registers 12. For example, five registers respectively identified as the M, E, A, ST1 and ST2 registers are shown in FIG. 1. The M register can for example be utilized to hold the multiplier in multiplication operations. The E register can function as an entry register for storing information entered by way of the keyboard 14. The A register can be used as an accumulator. The ST1 and ST2 registers can be used for general storage.

Transfer means only generally represented in FIG. 1, are provided for transferring information between the registers under the control of control means 16. Additionally, the control means 16 controls the coupling of the M, E and A registers to an arithmetic unit 18 capable of performing various arithmetic operations with respect to the numbers applied thereto. The output of the arithmetic unit 18 is applied to the A register.

As A system 20 is provided for automatically supplying successive instructions to the control means 16, in order to execute a sequence of operations. In accordance with the present invention, the system 20 is able to move a program record or card in a bidirectional manner in response to both instructions read from the program record and the content of certain ones of the calculator registers, to thus execute problems which require successive iterations. More generally, the system 20 in accordance with the present invention permits the program card to define both unconditional and conditional branch instructions. As will be better appreciated hereinafter, the system 20 in accordance with the present invention can move a program card in a forward direction past a reading means so as to enable the reading means to read the successive instructions on the card sequence. When an unconditional branch instruction is read, the card transport mechanism will unconditionally move the card (in either a first or second direction depending upon the nature of the unconditional branch instruction) until a sought instruction is sensed. On the other hand, if a conditional branch instruction is sensed, then the content of the A register is examined to determine whether a branch operation should in fact occur or whether the immediately succeeding instruction on the program card should be executed.

The system 20 in accordance with a preferred embodiment of the present invention utilizes a substantially conventional data processing card 22, shown only generally in FIG. 1 and in greater detail in FIG. 4A. The system 20 further includes a card transport mechanism 24 which moves the card 22 across a guide surface 26. The card 22 is moved between a pair of roller pairs. The first roller pair includes a drive roller 28 and an a idler roller 30. The second roller pair similarly includes a drive roller 32 and an idler roller 34. The drive rollers 28 and 32 are driven by belt or chain 34 which is in turn driven by a drive wheel 36 coupled to the shaft 38 of the armature 40 of the bidirectional motor 42.

The card 22 carries indicia which represents a plurality of successive instruction codes to which the control means 16 is responsive. It is contemplated in accordance with the present invention that the indicia can be represented in several different forms. Thus, the indicia can comprise holes punched in the card, magnetic spots deposited on the card, optically recognizable spots printed on the card, etc. Regardless of the nature of the indicia representing the instructions, a sensor or reading means 44, of an appropriate type, is supported proximate to the path of the card 22. The output of the sensor 44 is connected to the control means 16.

The system 20 further includes means for selectively actuating the card transport means 24. More particularly, the system 20 includes means for energizing the motor 42 to rotate the armature 40 in either a first direction or a second direction. As will be more readily appreciated hereinafter, the direction of motor rotation is determined by a bistable device such as the D flip-flop 46. The D flip-flop 46 can be a conventional set-reset flip-flop. Let it be assumed that when the control means 16 applies a pulse to the set input terminal 48, it switches the flip-flop 46 to a true state to thus drive the motor armature 40 and card 22 in a first or forward direction. On the other hand, when AND gate 50 provides a pulse to the reset input terminal 52 to switch the flip-flop 46 to a false state, it rotates the motor armature 40 and moves the card 22 in a second or reverse direction. As shown in FIG. 1, the AND gate 50 is responsive to the output of the control means 16 and the content of the A register.

The true and false output terminals 54 and 56 of the flip-flop 46 are connected to gates 58 and 60, which respectively control A and B flip-flops 62 and 64. That is, the gates 58 and 60 determine the sequence in which the A and B flip-flops 62 and 64 are switched by pulses supplied by the clock pulse source 66. The mechanization of the gates 58 and 60 can be ascertained by reference to the truth tables of FIGS. 2B and 3B to be discussed hereinafter. Suffice it to say at this point that the true output terminal of flip-flop 62 is connected to a coil driver 66 whose output is connected to coil 1 of the bidirectional motor 42. The false output terminal of flip-flop 62 is connected to coil driver 68 whose output is connected to motor coil 2. The true and false output terminals of l flip-flop 64 are connected to coil drivers 70 and 72 whose outputs are respectively connected to motor coils 3 and 4.

In order to drive the motor armature 40 in a first direction, the motor coils can be energized in accordance with a first sequence represented in FIG. 2A. For example, FIG. 2A represents the coils 1, 2, 3 and 4 being energized in sequence. On the other hand, in order to move the motor armature 40 in the opposite direction, the motor coils can be energized in accordance with the sequence represented by FIG. 3A; i.e., coils 4, 3, 2, 1.

In order for the coils to be energized in the sequence represented by the wave forms of FIG. 2A, the A and B flip-flops 62 and 64 should be switched in response to each pulse provided by clock pulse source 66, in accordance with the truth table shown in FIG. 2B. Similarly, in order to energize the coils in the sequence represented by the wave forms of FIG. 3A, the A and B flip-flops 62 and 64 should be switched in accordance with the truth table of FIG. 3B. The gates 58 and 60 implement the truth tables of FIGS. 2B and 3B. More particularly, when the direction (D) flip-flop 46 is true, the gates 58 and 60 implement the truth table of FIG. 2B and when the direction flip-flop 46 is false, the gates 58 and 60 implement the truth table of FIG. 3B.

Attention is now called to FIG. 4A which illustrates a typical data processing card 22 which can be utilized in the system of FIG. 1. The card 22 is illustrated as having twelve columns and N rows. The twelve columns of course permit $2^{12}$ different codes to be defined. In a system in accordance with the invention, the codes would primarily represent instructions to which the control means 16 of FIG. 1 is responsive. More particularly, in accordance with the present invention at least some of the codes would represent conditional and unconditional branch instructions. Typical unconditional branch instructions are: (1) UNCONDITIONAL REWIND and (2) UNCONDITIONAL SKIP. When the sensor means 44 of FIG. 1 reads an UNCONDITIONAL REWIND instruction, the control means 16 causes the card 22 to be moved in a reverse direction until the sensor means 44 reads a FORWARD instruction. On the other hand, when an UNCONDITIONAL SKIP instruction is read, the control means 16 causes the card 22 to be moved in a forward direction until a subsequent FORWARD instruction is sensed. Thus, it will be appreciated that the unconditional branch instructions are not dependent upon the content of any of the registers. In contrast, the conditional branch instructions, i.e., (1) CONDITIONAL REWIND and (2) CONDITIONAL SKIP are dependent upon the algebraic sign of the content of the A register. Thus, if the content of the A register is negative, the CONDITIONAL REWIND instruction causes the card 22 to be moved in a reverse direction until a FORWARD instruction code is read. Similarly, if a CONDITIONAL SKIP instruction is read and the content of the A register is negative, then the card 22 moves in a forward direction seeking the next FORWARD instruction code. On the other hand, if the content of the A register is positive, the conditional branching instruction will have no effect and the succeeding instruction will be executed.

The utilization of conditional branching codes extends the capability of the calculator and enables problems requiring successive iterations to be performed. A simple example of one such problem is illustrated by Table I which presents a card program for raising a quantity $X$ to a power $n$.

TABLE I

CARD PROGRAM $X^n$ where n is a positive whole number

Note: Assume n = 3

| | INSTRUCTIONS | ACTIONS | REGISTER CONTENTS M | E | A | ST1 | ST2 |
|---|---|---|---|---|---|---|---|
| Input | 1) Stop | enter (n-1) | | 2 | | | |
| | 2) Transfer A | transfer E(n-1)→A | | 0 | 2 | | |
| | 3) Store 2 | transfer A(n-1)→ST2 | | 0 | 2 | | 2 |
| | 4) Stop | enter x | | x | | | |
| | 5) Transfer M | transfer E(x)→M | x | x | 2 | | 2 |
| | 6) Transfer A | transfer E(x)→A | x | 0 | x | | 2 |
| | 7) Store 1 | transfer A(x)→ST1 | x | 0 | x | x | 2 |
| | 8) Forward | | | | | | |
| | 9) Recall 1 | transfer ST1 (x)→E | x | x | x | x | 2 |
| | 10) Multiply | multiply M9X)·E(x)→A | x | 0 | $x^2$ | x | 2 |
| | 11) Store 1 | transfer A($x^2$)→ST1 | x | 0 | $x^2$ | $x^2$ | 2 |
| | 12) Recall 2 | transfer ST2(2)→E | x | 2 | $x^2$ | $x^2$ | 2 |
| | 13) Transfer A | transfer E(2)→A | x | 0 | 2 | $x^2$ | 2 |
| | 14) 1 | enter 1→E | x | 1 | 2 | $x^2$ | 2 |
| | 15) Subtract | subtract;A(2)-E(1)→A | x | 0 | 1 | $x^2$ | 2 |
| | 16) Store 2 | transfer A(1)→ST2 | x | 0 | 1 | $x^2$ | 1 |
| | 17) Transfer A | transfer E(o)→A | x | 0 | 0 | $x^2$ | 1 |
| | 18) Recall 2 | transfer ST2(1)→E | x | 1 | 0 | $x^2$ | 1 |
| | 19) Conditional Rewind | subtract;A(o)-E(1)→A; if A is negative,rewind to forward | | | | | |
| | 20) Stop | | x | 0 | 0 | $x^3$ | 0 |

FIG. 4B illustrates a flow chart corresponding to the program of Table I. It will be noted that steps 1—7 of the program constitute an input portion during which the quantities $X$ and $n-1$ are entered by the keyboard. Steps 8—18 determine the product of $X$ and the products of $X$ accumulated during prior in iterations. Additionally steps 8—18 decrement the exponent value by one for each iteration. Thus, during an initial iteration, $X$ is multiplied by itself with the product being stored and the entered exponent quantity ($n-1$) being reduced by one. Thus, after $k$ iterations, the accumulated product will be equal to $X^{k+}1$ and the decremented exponent quantity will be equal to $n-1-k$. If $n$ were equal to three, for example, then after two iterations, the accumulated product would be equal to $X^3$ and the decremental exponent would be equal to zero. By subtracting one from the quantity $n-1-k$, its algebraic sign can be tested by a CONDITIONAL REWIND operation (step 19) to determine whether further iterations are necessary. If a further iteration is necessary, as evidenced by the A register being negative, then step 8 is next performed. On the other hand, if the A register content is negative meaning that the required number of iterations has already been performed, then the instruction corresponding to step 20 is next read.

From the foregoing, it will be appreciated that a system has been disclosed herein for use in conjunction with an electronic calculator for automatically causing the calculator to execute a series of instructions. The system in accordance with the invention provides for the instructions to be represented on an indicia bearing record which can be bidirectionally moved to thus enable branch instructions to be executed. By providing for conditional branch instructions, a calculator utilizing the teachings of the present invention can execute problems requiring iterations for their solution.

Although particular embodiments of the invention have been described and illustrated herein, it is recognized that modifications and variations may readily occur to those skilled in the art. For example only, whereas a bidirectional motor of the stepping type has been illustrated in the preferred embodiment, other types of bidirectional motors could be satisfactorily employed. Similarly, different arrangements of control circuitry could be utilized. Accordingly, it is intended that the claims be interpreted to cover such modifications and equivalents.

We claim:

1. A calculating apparatus including:

a record means bearing indicia representing a plurality of instructions;

reading means sensitive to indicia on said record means for reading instructions represented thereby;

a plurality of number storing registers;

a control means responsive to instructions read by said reading means for executing operations with respect to numbers stored in said registers;

a transport means actuatable to selectively move said record means and said reading means relative to one another in first and second directions; and transport actuating means responsive to said control means and to the content of at least one of said registers for actuating said transport means to selectively move said record means and said reading means relative to each other in either said first or second direction.

2. The apparatus of claim 1 wherein said record means comprises a flat card; and wherein said transport means moves said flat card past said reading means.

3. The system of claim 1 wherein said transport means includes a bidirectional motor having at least first and second field windings; and wherein said transport actuating means includes means for energizing said first and second field windings in accordance with a first sequence to move said bidirectional motor in a first direction and in accordance with a second sequence to move said bidirectional motor in a second direction.

4. The system of claim 3 wherein said transport actuating means includes a bistable device capable of defining first and second states;

a source of pulses; and gating and logic means for directing said pulses to said first and second field windings in accordance with either said first or second sequence dependent upon the state defined by said bistable device.